United States Patent
Huang et al.

(10) Patent No.: US 11,145,205 B2
(45) Date of Patent: Oct. 12, 2021

(54) PARKING FEE CHARGING SYSTEM AND OPERATING METHOD THEREOF

(71) Applicant: Wei Chi Huang, Taipei (TW)

(72) Inventors: Wei Chi Huang, Taipei (TW); Man Hon Anthony Lee, New Taipei (TW)

(73) Assignee: Wei Chi Huang, Taipei (TW)

( * ) Notice: Subject to any disclaimer, the term of this patent is extended or adjusted under 35 U.S.C. 154(b) by 59 days.

(21) Appl. No.: 16/822,573

(22) Filed: Mar. 18, 2020

(65) Prior Publication Data

US 2020/0219395 A1 Jul. 9, 2020

Related U.S. Application Data

(62) Division of application No. 16/357,548, filed on Mar. 19, 2019, now Pat. No. 10,706,723.

(30) Foreign Application Priority Data

Mar. 29, 2018 (TW) .................................. 107111059

(51) Int. Cl.
*G08G 1/14* (2006.01)
*G06K 9/32* (2006.01)

(52) U.S. Cl.
CPC ........... *G08G 1/147* (2013.01); *G06K 9/3258* (2013.01); *G06Q 2240/00* (2013.01)

(58) Field of Classification Search
CPC .......... G08G 1/147; G08G 1/04; G08G 1/205; G08G 1/144; G08G 1/017; G08G 1/005; G06K 9/3258; G06K 9/00771; G06Q 2240/00; G07B 15/02

USPC ....................................................... 340/932.2
See application file for complete search history.

(56) References Cited

U.S. PATENT DOCUMENTS

| | | | |
|---|---|---|---|
| 2007/0029825 A1* | 2/2007 | Franklin | G06Q 30/0284 293/128 |
| 2008/0071611 A1* | 3/2008 | Lovett | G07B 15/063 705/13 |
| 2012/0130872 A1* | 5/2012 | Baughman | G08G 1/146 705/32 |
| 2015/0142533 A1* | 5/2015 | Shalev | G06Q 20/145 705/13 |
| 2015/0229750 A1* | 8/2015 | Zhou | H04M 1/0272 705/44 |
| 2019/0122449 A1* | 4/2019 | Rosas-Maxemin | G08G 1/146 |
| 2020/0013291 A1* | 1/2020 | Rosas-Maxemin | G07B 15/02 |

* cited by examiner

*Primary Examiner* — Omar Casillashernandez
(74) *Attorney, Agent, or Firm* — Rosenberg, Klein & Lee (57) ABSTRACT

A system and method for addressing roadside parking issues are provided. The method includes: determining whether a parking fee has been paid for an on-street parking space, and if not, activating a detector of the corresponding parking meter; determining whether an object exists in the parking space and whether the object, if existing, is a vehicle, and if yes to both, activating a camera of the parking meter to obtain an image of the parking space; determining again whether the object is a vehicle by performing image and license plate recognition, and if yes, either prompting a parking enforcement officer to go to the parking space and issue a parking ticket or issuing the parking ticket automatically; updating the parking meter after the parking ticket is issued; and reducing the detection frequency. The method is labor-saving and reduces power consumption by the parking meter.

15 Claims, 5 Drawing Sheets

PARKING FEE CHARGING SYSTEM AND OPERATING METHOD THEREOF

RELATED PATENTS AND APPLICATIONS

This application is a divisional application of co-pending U.S. patent application Ser. No. 16/357,548, filed on Mar. 19, 2019.

BACKGROUND OF THE INVENTION

1. Technical Field

The present invention relates to a parking fee charging system composed of parking meters and to the operating method of the system.

2. Description of Related Art

Parking authorities and the related industry have made great efforts to address the issue of how to plan effective on-street parking spaces in urban areas, where space is at a premium, and inform the public of the states of use of those parking spaces.

One typical example of the various systems designed to address the aforesaid issue is disclosed in Taiwan Invention Patent No. 1333177, which provides a parking fee charging system that times the use of parking spaces by means of long- and short-distance radio communication and contactless cards. This patented system allows a local parking management station to communicate with the parking management information center through a combination of long- and short-distance radio communication networks.

While the '177 patent discloses integrating GPRS/GSM or other radio communication systems into the parking meters to facilitate the update of transaction data or the transmission of information, the limitations imposed by the size of the parking meter housing and by the fact that the parking meters are installed on the side of the road make it impossible to construct a mains distribution network (e.g., an underground one) for the parking meters wherever and whenever desired; in other words, the electricity required for the parking meters and for the radio communication may have to come from batteries, rechargeable or not, instead of the mains. If the system includes a large number of parking meters, the labor cost and material cost incurred by replacing or recharging the batteries will be considerable.

A conventional off-street parking lot typically has induction loops buried in the ground and is monitored by digital cameras around the clock in order to determine the time of arrival and departure of each vehicle parked in the parking lot. Generally, an off-street parking lot is a closed plot of land with a fixed entrance and exit, is installed with a mains distribution network that ensures sufficient power supply, and can therefore detect incoming and outgoing vehicles satisfactorily.

In an open on-street parking environment, however, the conventional detection equipment tends to produce inaccurate detection results because of the aforesaid limitations on power supply and environmental or human interventions. For example, induction loops or ground detectors may have detection errors associated with the position of the vehicle being detected, are subject to interference from a passing metallic object, and hence do not make an accurate detection system for parked cars. Other detection methods such as infrared detection may be affected by weather conditions or may consume too much power due to continuous operation.

Furthermore, the parking fee of an off-street parking lot is generally charged in the following manner: the timing of the parking period of a vehicle starts when the vehicle enters the parking lot, and the parking fee is calculated when the vehicle leaves the parking lot to conclude the parking period. On-street parking spaces, on the other hand, are open spaces and therefore cannot use the foregoing charging scheme of an off-street parking lot. The parking fee of an on-street parking space is either paid in advance by the parking space user for a preselected period or charged by a patrol, or parking enforcement officer, who issues parking tickets. If, for any reason, the parking space user's vehicle fails to leave the parking space by the end of the preselected period, the user will be given an overtime parking ticket, which not only causes trouble to the user, but also requires the additional labor for writing the ticket.

Accordingly, it is highly desirable to design a better parking fee charging system and method that can effectively detect whether a parking space is used and paid for, and can reduce the electricity consumed by parking meters as well as the labor required for patrolling and issuing parking tickets.

BRIEF SUMMARY OF THE INVENTION

To solve the aforesaid problems of the prior art, the present invention provides a parking fee charging system that is applicable to a plurality of on-street parking spaces. The parking fee charging system includes a management center, a plurality of parking meters, and at least one mobile device. Each parking meter is provided beside at least one corresponding on-street parking space and is configured to detect the properties and states of the object, if any, in the corresponding parking space and whether a parking fee has been paid for the object and to transmit parking information of the corresponding parking space to the management center via a network. The mobile device is provided with an executable application program and is configured to transmit an execution result of the application program to the management center via the network. Once a user parks a vehicle in one of the parking spaces, operates the corresponding parking meter, and pays a parking fee corresponding to an estimated parking period, the corresponding parking meter displays an identification barcode corresponding to the parking information of the parking space so that the user may use the mobile device to read the identification barcode and thereby obtain the parking information. When the parking time limit of the parking meter in question is about to be reached, the management center transmits a payment notice to the user's mobile device via the network and, as soon as the required parking fee is paid, updates the parking information in the parking meter via the network. Or, if the car has been parked longer than the estimated parking period and the user has not paid for the next parking period, the management center will identify the license plate of the vehicle automatically based on the detection result of the parking meter and then either prompt a parking enforcement officer to go to the vehicle and issue a parking ticket or issue the parking ticket automatically.

Preferably, the parking fee charging system further includes a parking ticket issuing device configured for signal connection to the management center via the network. When the parking time limit of one of the parking meters is exceeded, the management center is connected to the parking ticket issuing device via the network to prompt the parking enforcement officer to go to that parking meter and issue a parking ticket for the overtime-parked vehicle through the parking ticket issuing device.

Preferably, the parking ticket issuing device transmits parking ticket issuance information to the management center after issuing a parking ticket, and in response to the parking ticket issuance information, the management center updates the parking information in the corresponding parking meter via the network.

Preferably, the parking ticket issuing device is also configured for signal connection to the parking meters and can, after issuing a parking ticket, directly update the parking information in the corresponding parking meter.

Preferably, the management center includes an image processing unit for performing vehicle and license plate recognition according to an image uploaded from a parking meter.

Preferably, the management center further includes an automatic parking ticket issuing unit for issuing parking tickets automatically.

Preferably, the management center further includes a guiding unit for recording the locations and states of the on-street parking spaces according to the state of each parking space as transmitted from the corresponding parking meter.

Preferably, the mobile device can connect to the management center through the application program and the network and display on a map the location and state of each on-street parking space according to the record of the guiding unit.

Preferably, each of the parking meters includes: a housing; a control circuit provided in the housing; a display panel provided on the front side of the housing and electrically connected to the control circuit; an operation panel provided on the front side of the housing and having a plurality of operation buttons, each operation button being electrically connected to the control circuit so that the parking meter can be operated through the operation buttons; a chip card accessing device provided in the housing and electrically connected to the control circuit in order to access chip cards and thereby process fee payments made through chip cards; at least one detector provided on the front or rear side of the housing or at one or two predetermined positions of the housing, wherein the at least one detector is separately electrically connected to the control circuit in order to detect the state of the corresponding on-street parking space; at least one camera provided on the front side of the housing or at one or two predetermined positions of the housing, wherein the at least one camera is electrically connected to the control circuit in order to take images of one or two on-street parking spaces; a communication module provided in the housing and electrically connected to the control circuit in order to communicate with an external device; and a battery module provided in the housing to provide the electricity required by the parking meter.

Preferably, the communication module of each parking meter includes a security access module.

Preferably, each parking meter further includes an artificial intelligence module for performing image and license plate recognition on a detected object.

Preferably, the parking fee charging system further includes plural pairs of auxiliary parking meters, each pair being respectively installed at two opposite end edges of the at least one parking space corresponding to a parking meter. Each auxiliary parking meter includes at least one camera and a transmission module.

Preferably, each pair of auxiliary parking meters and the corresponding parking meter work together to take images of the vehicle(s) in the at least one corresponding parking space.

The present invention also provides the operating method of a parking fee charging system, wherein the parking fee charging system uses at least one parking meter to charge parking fees for at least one on-street parking space. The operating method begins by determining whether a parking fee has been paid for the on-street parking space, and if not, the detector of the parking meter is activated. Then, according to the detection result of the detector, it is determined whether an object exists in the on-street parking space and whether the object, if existing, is a vehicle. If both determination results are positive, the camera of the parking meter is activated to take an image of the on-street parking space. Image and license plate recognition is subsequently performed to confirm whether the object in the on-street parking space is a vehicle. If yes, either a parking enforcement officer is prompted to go to the on-street parking space to issue a parking ticket, or the parking ticket is issued automatically by a management center. Once the parking ticket is issued, the parking meter is updated. Then, with the detection frequency of the detector reduced, the process flow returns to the step of determining whether a parking fee has been paid for the on-street parking space to complete a full cycle.

Preferably, the detection frequency of the detector is also reduced after it is determined that a parking fee has been paid for the on-street parking space and before the subsequent steps are performed, and after it is determined that no object exists in the on-street parking space or that the object in the on-street parking space is not a vehicle and before the subsequent steps are performed, and after it is confirmed by image and license plate recognition that the object in the on-street parking space is not a vehicle and before the subsequent steps are performed.

Preferably, confirming whether the object in the on-street parking space is a vehicle is carried out by detecting the distance to, and the width and material of, the object and determining whether the detected properties are similar to those of a vehicle.

DETAILED DESCRIPTION OF THE INVENTION

Please refer to FIG. 1 to FIG. 3 and FIG. 5 respectively for a schematic circuit diagram, a schematic front view, and a schematic placement diagram of an embodiment of the parking meters in the present invention and a schematic diagram of an embodiment of the parking fee charging system of the invention.

Figure 1:
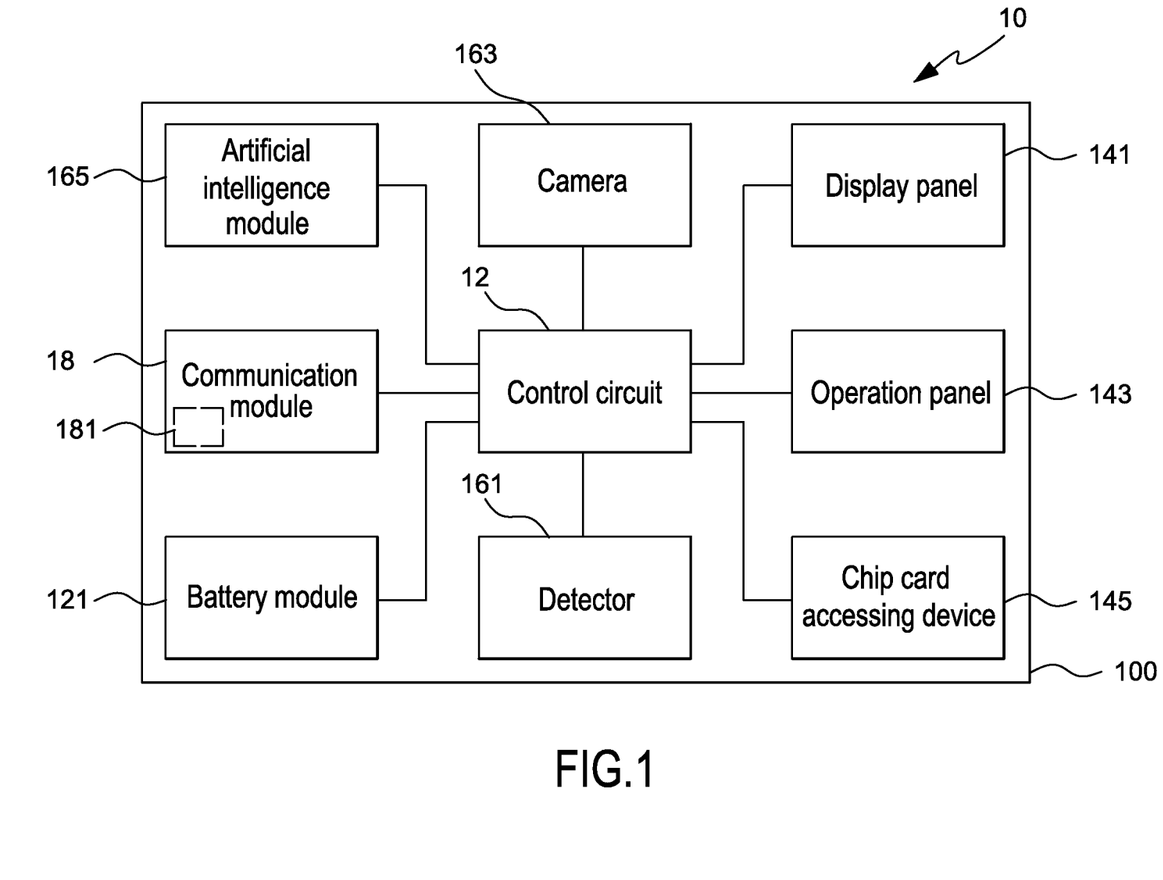
FIG. 1 is a schematic circuit diagram of an embodiment of the parking meters in the present invention.
Figure 2:
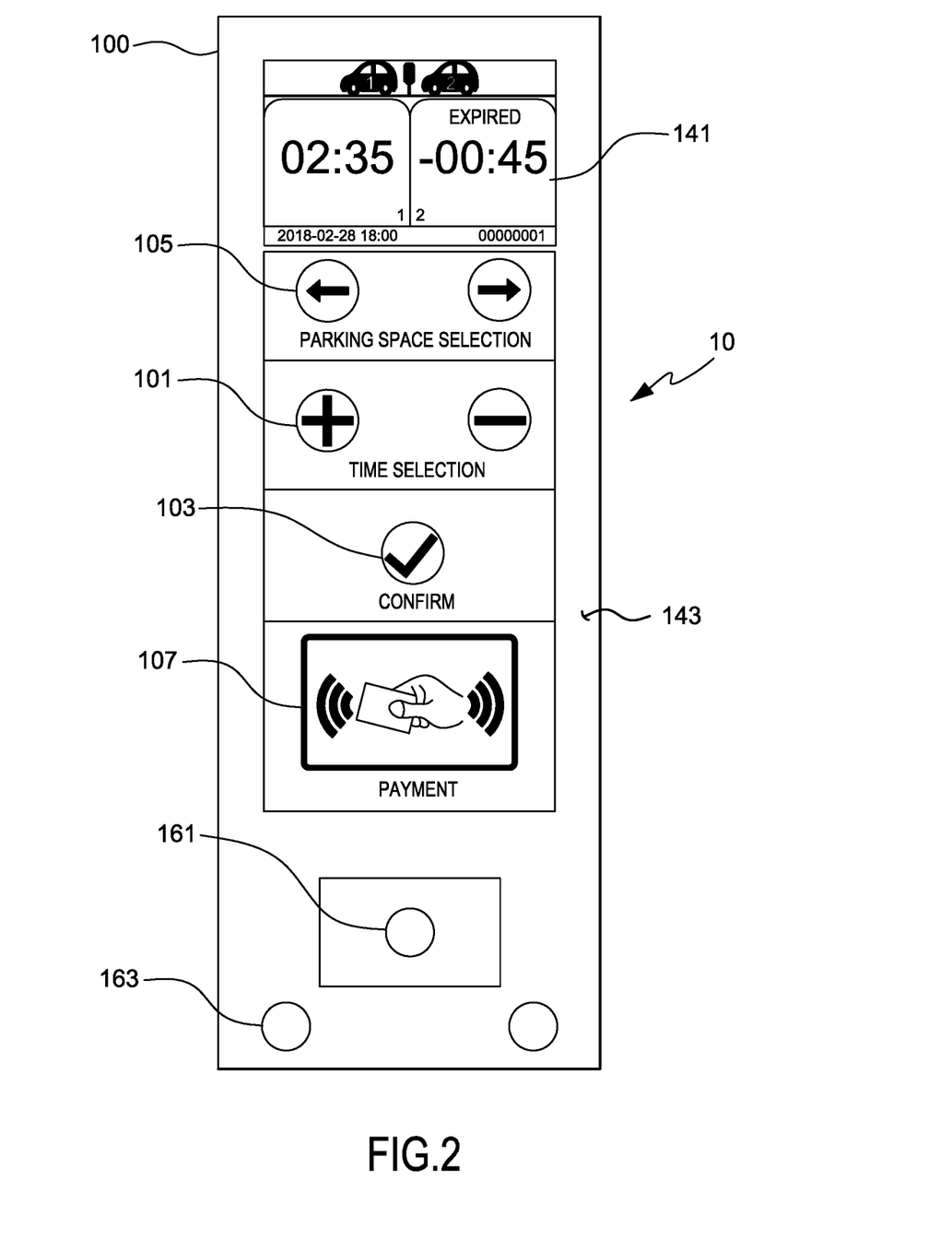
FIG. 2 is a schematic front view of the embodiment of FIG. 1.

As shown in FIG. 1 and FIG. 2, the parking meter 10 includes a housing 100; a display panel 141 and an operation panel 143, both provided on the front side of the housing 100; a chip card accessing device 145 provided in the housing 100; a detector 161 provided on the front or rear side of the housing 100; one or two cameras 163 provided at a predetermined position, or respectively at two predetermined positions, of the housing 100; a communication module 18 provided in the housing 100; a battery module 121 provided in the housing 100 to supply the electricity required by the parking meter; and a control circuit 12 electrically connected to the display panel 141, the operation panel 143, the chip card accessing device 145, the detector 161, the one or two cameras 163, the communication module 18, and the battery module 121. The detector 161 and the one or two cameras 163 may swap positions in other feasible embodiments; for example, there may be one camera 163 on the front side of the housing 100 and one or two detectors 161 at a predetermined position, or respectively at two predetermined positions, of the housing 100.

Figure 3:
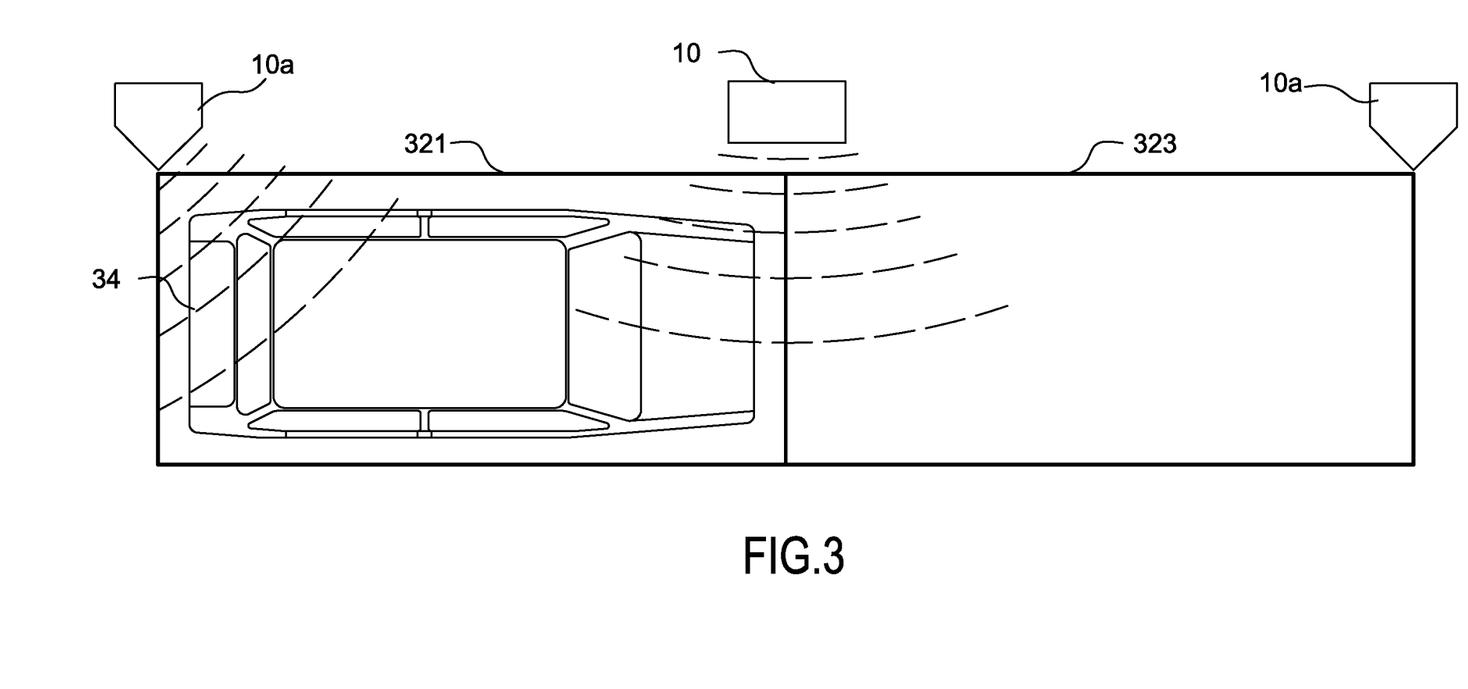
FIG. 3 schematically shows the placement of the embodiment of FIG. 1.

The operation panel 143 has a plurality of operation buttons separately electrically connected to the control circuit 12 so that the parking meter 10 can be operated via the operation buttons. The operation buttons may include a time selection button 101, a parking space selection button 105, and a confirmation button 103, in order for a user to select and confirm the desired parking period and parking space, and for a parking fee to be calculated accordingly. There may be a single time selection button 101 so that the selected parking period increases according to number of times for which the button is pressed or touched. Or, there may be two time selection buttons for increasing and decreasing the selected parking period respectively, and in that case the desired parking period can be set by operating the increasing button 101 and the decreasing button 101 as needed. Similarly, there may be one or two parking space selection buttons 105: in the former case the desired parking space can be selected by operating the single button for the corresponding number of times, and in the latter case the desired parking space can be specified by operating the corresponding button directly. Please refer also to FIG. 3 for how the parking space selection button(s) 105 work. When the parking meter 10 is installed for two adjoining on-street parking spaces 321 and 323 as shown in FIG. 3, the parking space selection button(s) 105 can be operated to select either one of the on-street parking spaces 321 and 323. The operation buttons are preferably touch control buttons, which help enhance the strength and watertightness of the housing 100 by reducing the openings and gaps in the housing.

The chip card accessing device 145 is provided in the housing 100 and preferably in a lower portion of the interior of the housing 100, and a chip card accessing area (represented by the sensing area 107 in FIG. 2) is provided at a corresponding position of the operation panel 143 so that the chip card accessing device 145 can access a chip card (not shown) in order to charge a parking fee through the chip card. Preferably, the chip card accessing device 145 is of the contactless type to enable access to contactless chip cards. Applicable contactless chip cards include contactless prepaid cards, contactless credit cards, contactless ATM/debit cards, contactless electronic purses, mobile phones with a near-field communication (NFC) payment function, and so on.

The detector 161 is electrically connected to the control circuit 12 and is configured to detect the states of the corresponding on-street parking spaces. When provided on the front side of the housing 100, the detector 161 can detect the two adjoining on-street parking spaces 321 and 323 at the same time. If two detectors 161 (not shown) are provided on two lateral sides of the housing 100 respectively, each detector 161 will be in charge of detecting the corresponding one of the on-street parking spaces 321 and 323. That is to say, the states of the on-street parking spaces 321 and 323 can be detected as long as the detector(s) 161 are properly positioned. Preferably, the detector 161 is an ultrasonic detector, a laser detector, or a millimeter-wave super-high-frequency detector. The aforesaid detectors can emit ultrasonic signals, laser beam signals, or super-high-frequency signals to detect whether an object exists in the on-street parking spaces 321 and 323, as shown in FIG. 3. When an object is detected, the detector 161 further performs high-precision detection of the distance to the object and of the size and surface material of the object. If it is determined that the detected properties are similar to those of a vehicle, the cameras 163 will be activated to take images of the on-street parking spaces 321 and 323, wherein the images are the basis on which to determine whether the object is a vehicle and, if yes, to identify the license plate of the vehicle.

The cameras 163, which may be provided on the front side of the housing 100 or at a predetermined position, or respectively at two predetermined positions, of the housing 100, are connected to the control circuit 12 and are configured to take images of the on-street parking spaces 321 and 323 so that image recognition can be performed to confirm the states of the on-street parking spaces 321 and 323. If the parking meter 10 is installed for a single on-street parking space, a properly set shooting angle ensures that satisfactory images of the on-street parking space can be obtained. Parking space images can be processed for license plate recognition either by the artificial intelligence module 165 in the parking meter 10 in FIG. 2 or by the image processing unit 528 in the management center 52 in FIG. 5. The artificial intelligence module 165 or the image processing unit 528 will transmit the recognition result to an automatic parking ticket issuing unit 529 or allow the recognition result to be downloaded to a parking enforcement officer' portable device to facilitate the issuance of parking tickets. Preferably, the detection angle of the detector 161 or the shooting angles of the cameras 163 can be adjusted in order to obtain information and images of the on-street parking spaces 321 and 323 with higher precision.

Preferably, the detector 161 uses a very low-power time-of-flight (ToF) or ultrasonic sensor for 24-hour detection of the states of the corresponding parking spaces. This not only allows images to be taken of the vehicle(s) in the corresponding parking spaces as soon as the vehicle(s) enter the parking spaces, but also allows high-precision images of the parking spaces to be taken, making it easier to obtain and identify license plate information.

Moreover, as a vehicle is not always parked at the same position in a parking space, the detection/shooting angles and fields of view of the detector 161 and of the cameras 163 may not always ensure that license plate recognition can be performed accurately, if can be performed at all. Therefore, another embodiment of the present invention further includes a pair of auxiliary parking meters 10*a* installed respectively at two opposite end edges of the parking spaces 321 and 323 corresponding to the parking meter 10 (as shown in FIG. 3). Each auxiliary parking meter 10*a* includes at least one camera and a transmission module. Whenever the parking meter 10 takes an image, referring to FIG. 3, the auxiliary parking meters 10*a* are activated at the same to take images respectively of the license plates at the front and back of the vehicle 34 parked in the parking space 321. This helps in license plate recognition and comparison so that accurate and consistent license plate recognition results can be obtained.

The communication module 18 is electrically connected to the control circuit 12 and is configured to communicate with an external device. Preferably, the communication module 18 is a mobile communication module, a sub-1 GHz communication module, a narrow-band internet-of-things (NB-IoT) communication module, or a combination of the above. The mobile communication module may be based on the 3G, long-term evolution (LTE), 4G, or other mobile communication standards. Preferably, the communication module 18 further includes a security access module (SAM) 181 for encrypting and decrypting the data being transmitted, thereby achieving security of data transfer.

The display panel 141 is preferably an electronic paper display. Electronic paper displays feature structural simplicity, low susceptibility to damage, clarity in display, and low power consumption; can be clearly read under extreme environmental conditions such as in bright sunlight and poorly lit places; and are also effective in saving electricity.

Figure 5:
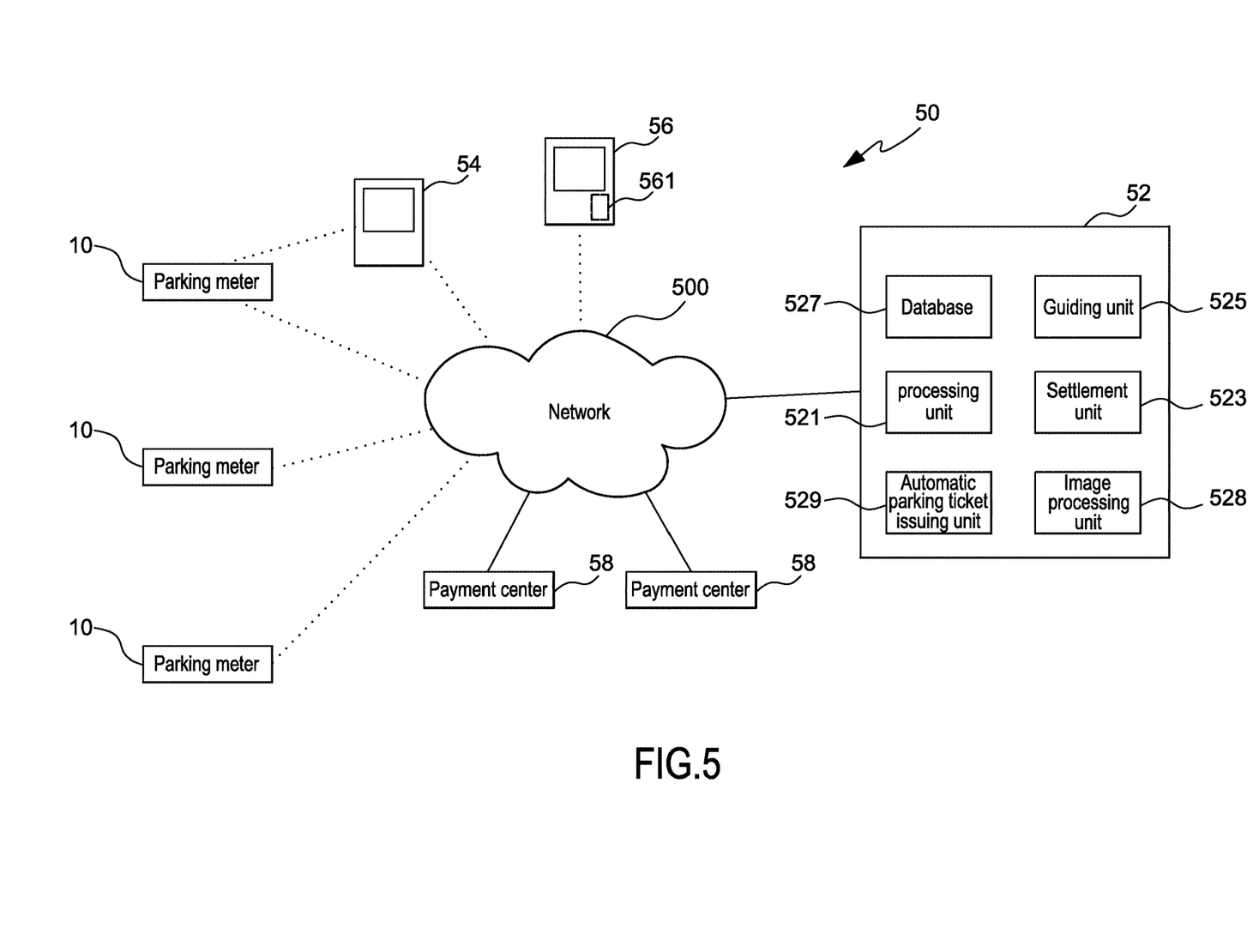
FIG. 5 schematically shows an embodiment of the parking fee charging system of the invention.

A parking fee charging system 50 incorporating the foregoing parking meter 10 is disclosed below with reference to FIG. 5. The parking fee charging system 50 includes a management center 52, a plurality of parking meters 10 as shown in FIG. 1 and FIG. 2, and at least one mobile device 56. The management center 52, the parking meters 10, and the mobile device 56 are signal-connected to one another through a network 500. The management center 52 may have a processing unit 521, a settlement unit 523, a guiding unit 525, a database 527, an image processing unit 528, and an automatic parking ticket issuing unit 529, all of which are signal-connected to one another. The processing unit 521 controls the operation of the management center 52, performs all sorts of computation, and executes various application programs. The settlement unit 523 is in charge of calculating, performing statistical analysis on, and managing the parking fees of all the on-street parking space in the system and processing remote payments. The database 527 stores the parking information of each on-street parking space. The image processing unit 528 performs vehicle detection and license plate recognition on parking images uploaded from the parking meters 10. The automatic parking ticket issuing unit 529 issues payment notices for, or prompts a parking enforcement officer to go to and issue parking tickets for, vehicles whose parking fees are not paid and whose license plates have been identified.

More specifically, each parking meter 10 is installed beside the corresponding on-street parking spaces to detect the states of the parking spaces and, when a vehicle is parked in either of the parking spaces, measure the parking period of the vehicle so that a parking fee can be calculated accordingly. Each parking meter 10 is connected to the management center 52 through the network 500 in order to transmit the states and parking information of the corresponding on-street parking spaces to the management center 52. The mobile device 56 is provided therein with an application program 561 and can execute the application program 561 and connect to the management center 52 through the network 500.

After a user parks a vehicle in one of the on-street parking spaces of the system, operates the corresponding parking meter 10, and pays a parking fee corresponding to an estimated parking period, the display panel 141 of the corresponding parking meter 10 displays an identification barcode corresponding to the parking information of the parking space so that the user can obtain the parking information through the application program 561 by reading the identification barcode with the mobile device 56. The identification barcode is preferably a two-dimensional barcode or QR code. When the parking time limit is about to be reached, the management center 52 notifies the user of this through the application program 561 in the mobile device 56 by an electronic means such as by email or a short message, in order for the user to pay for the next parking period by connecting the mobile device 56 to the management center 52 through the application program 561 and the network 500 or by other payment methods accepted by the system, without having to go to, and make the payment at, the parking space. If the user drives the overtime-parked vehicle away from the parking space without paying the required parking fee, the system will issue a notice of parking fee make-up payment to the user according to the time at which the vehicle entered the parking space, the time at which the vehicle left the parking space (both times being detected by the corresponding parking meter 10), and the result of license plate recognition performed by the system on images taken of the vehicle. If the vehicle owner is already registered as a member of the system and uses a mobile phone that supports the system (e.g., is installed with electronic payment software for paying parking fees), the system will also send a payment message to the member's mobile phone. As soon as the user pays for the next parking period or a payment notice is issued, the management center 52 updates the parking information in the corresponding parking meter 10 by connecting to the corresponding parking meter 10 through the network 500. The parking information may include the number and location of the on-street parking space, the number of the corresponding parking meter, the parking period, the parking time limit, the parking fee, and so on.

Preferably, the parking fee charging system 50 further includes a parking ticket issuing device 54, which is connected to the management center 52 through the network 500. When the actual parking period of a vehicle exceeds the parking period paid for, i.e., when the parking time limit is exceeded, the management center 52 is connected to the parking ticket issuing device 54 through the network 500 to prompt a parking enforcement officer to go to the corresponding parking meter 10 and issue a parking ticket for the overtime-parked vehicle through the parking ticket issuing device 54. If the parking enforcement officer fails to issue the parking ticket at the corresponding parking meter 10 within a predetermined time limit, there may be a mechanism through which the management center 52 will perform an automatic parking ticket issuing operation. According to one embodiment of the present invention, the parking ticket issuing device 54 transmits parking ticket issuance information to the management center 52 after issuing a parking ticket, and the management center 52 is subsequently connected to the corresponding parking meter 10 through the network 500 to update the parking information in the corresponding parking meter 10. In other embodiments of the present invention, the parking ticket issuing device 54 may have the additional or alternative function of connecting directly to each parking meter 10 in order to directly update the parking information in any parking meter 10 after issuing a corresponding parking ticket.

Preferably, the management center 52 further includes a guiding unit 525 for recording the locations and states of all the on-street parking spaces in the system according to the state of each on-street parking space as transmitted from the corresponding parking meter 10. In one embodiment of the present invention, the mobile device 56 can connect to the management center 52 through the application program 561 and the network 500 and display on a map the location and state of each on-street parking space according to the record of the guiding unit 525. This allows a user to know the location and state of each on-street parking space via the mobile device 56 and reach the nearest available on-street parking space rapidly.

Preferably, the mobile device 56 is a mobile phone, a tablet computer, a laptop computer, or a personal digital assistant.

Preferably, a user can use the application program 561 in the mobile device 56 to pay a parking fee remotely through a payment center 58 (e.g., a bank or a third-party payment center).

Figure 4:
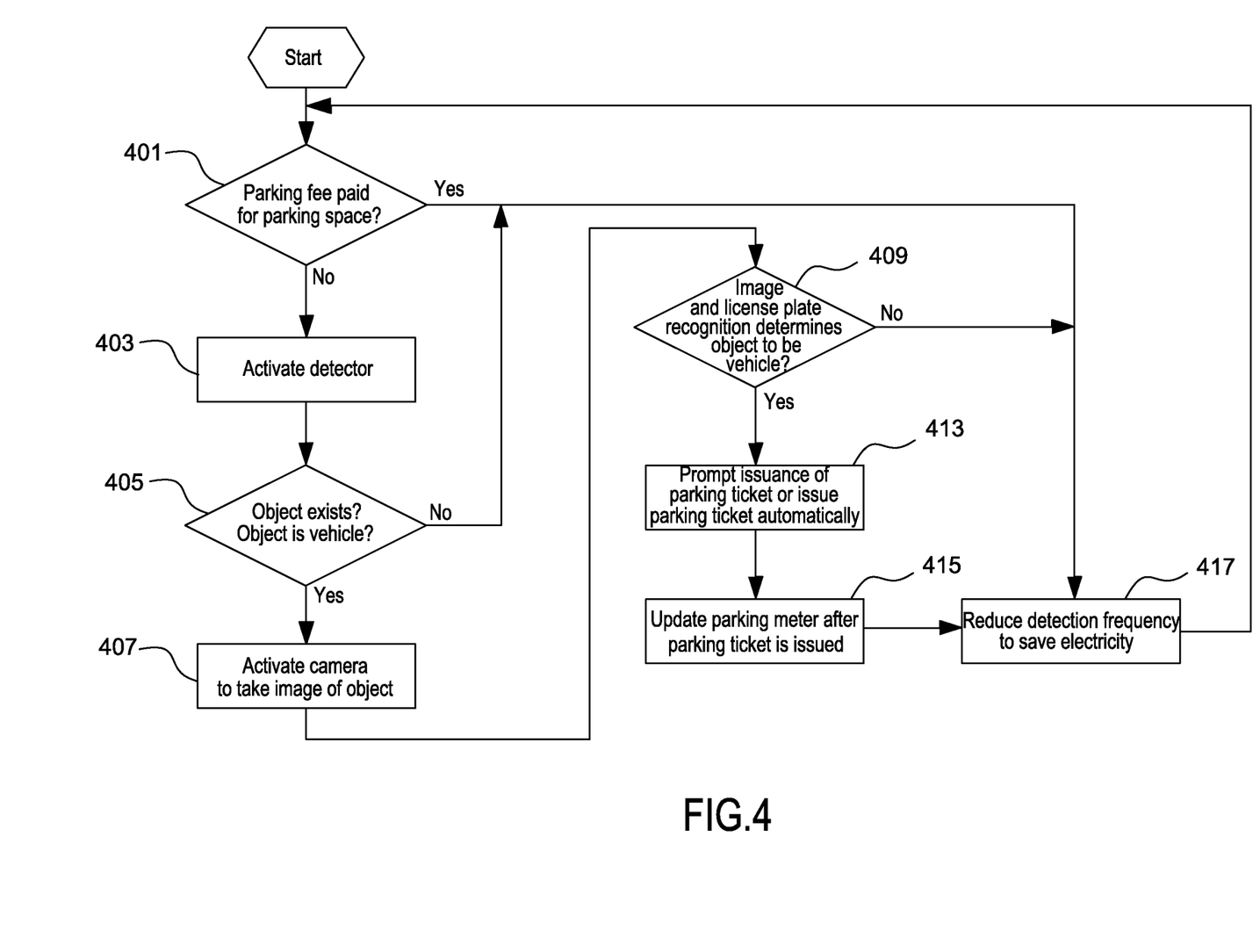
FIG. 4 is the flowchart of the operating method according to an embodiment of the invention.

The operating method described above of a parking fee charging system is summarized as follows with reference to FIG. 4 in conjunction with FIG. 1 and FIG. 5, wherein FIG. 4 is the flowchart of the operating method according to an embodiment of the present invention.

The operating method of the present invention starts with a parking meter 10 determining whether a parking fee has been paid for a corresponding on-street parking space (step 401). If no parking fee has been paid and no parking ticket has been issued either, or if the parking time limit has been exceeded but no parking ticket has been issued, the parking meter 10 will activate the detector 161 (step 403). Then, based on the detection result of the detector 161, it is determined whether an object exists in the on-street parking space and, if yes, whether the properties of the object are similar to those of a vehicle (step 405). To determine whether the properties of the object are similar to those of a vehicle, the following items may be detected: the distance to the object, the width of the object, and the material of the object.

If it is determined in step 405 that no object exists in the on-street parking space or that an object exists but its properties do not match those of a vehicle, step 417 will be performed to reduce the detection frequency of the detector 161, thereby reducing the power consumed by the parking meter, and then the process flow returns to step 401 to form a full cycle. If it is determined, on the other hand, that an object does exist in the on-street parking space and the properties of the object match those of a vehicle, step 407 will be performed to activate the cameras 163 in order to obtain images of the on-street parking space. Then, in step 409, image recognition and license plate recognition are performed on the images of the on-street parking space to determine again whether the object in the on-street parking space is a vehicle, and step 417 will be performed if not. If it is determined that the on-street parking space is indeed occupied by a vehicle, the process flow goes to step 413, in which either a parking enforcement officer is prompted to go to the on-street parking space and issue a parking ticket for the vehicle whose parking fee has yet to be paid or whose paid parking period has expired, or the management center 52 issues the parking ticket through the automatic parking ticket issuing unit 529 and sends a payment notice to the vehicle owner through the network; in either case, the parking information in the parking meter will be updated after the parking ticket is issued (step 415). Lastly, step 417 is performed to reduce the detection frequency and thereby reduce power consumption by the parking meter, and then the process flow goes back to step 401 to complete a full cycle.

A parking fee charging system based on the parking meter disclosed herein and the operating method of the system are such that only when a vehicle does exist in a parking space and is not paid for or has been parked longer than the paid parking period will a parking enforcement officer be prompted to issue a parking ticket or will the system issue the parking ticket directly. Thus, not only is the accuracy of system operation ensured, but also the parking enforcement officer is spared the trouble of unnecessary trips to and from the parking meters. Moreover, as useless detection is minimized and unnecessary communication through the communication module is reduced, power consumption by the parking meters will be substantially lowered to keep the parking meters (which may be powered by rechargeable or non-rechargeable batteries) at a working battery level for as long as possible.

The embodiments described above serve only as examples and are not intended to be restrictive of the scope of the present invention. All equivalent changes and modifications made according to the shapes, structures, features, methods, and spirit disclosed in the appended claims should fall within the scope of the invention.

What is claimed is:

1. A parking fee charging system, applicable to a plurality of on-street parking spaces, the parking fee charging system comprising:
   a management center;
   a plurality of parking meters, each provided beside at least one corresponding said on-street parking space to detect properties and states of an object in the corresponding on-street parking space and whether a parking fee has been paid for the object and to transmit parking information of the corresponding on-street parking space to the management center through a network; and
   at least one mobile device provided with an executable application program and configured for transmitting an execution result of the application program to the management center through the network;
   wherein after a user parks a vehicle in one of the on-street parking spaces, operates a corresponding said parking meter, and pays a parking fee corresponding to an estimated parking period, the corresponding parking meter displays an identification barcode corresponding to the parking information of the on-street parking space so that the user is able to obtain the parking information by reading the identification barcode with the mobile device; when a parking time limit of the corresponding parking meter is about to be reached, the management center sends a payment notice to the mobile device through the network; or when the vehicle has been parked in the on-street parking space longer than the estimated parking period without a parking fee paid for a next parking period, the management center either prompts a parking enforcement officer to go to the on-street parking space and issue a parking ticket according to a detection result of the corresponding parking meter or issues the parking ticket automatically according to the detection result of the corresponding parking meter; and the management center or the parking enforcement officer updates the parking information in the corresponding parking meter after a parking fee specified in the payment notice or in the parking ticket is paid.

2. The parking fee charging system of claim 1, further comprising:
   a parking ticket issuing device configured for signal connection to the management center through the network so that, when a parking time limit of one of the parking meters is exceeded, meaning a vehicle has been parked overtime in the corresponding on-street parking space, the management center is connected to the parking ticket issuing device through the network to prompt the parking enforcement officer to go to the parking meter and issue a parking ticket for the overtime-parked vehicle via the parking ticket issuing device.

3. The parking fee charging system of claim 2, wherein the parking ticket issuing device transmits parking ticket issuance information to the management center after issuing a parking ticket, in order for the management center to update the parking information in a corresponding said parking meter.

4. The parking fee charging system of claim 2, wherein the parking ticket issuing device is also configured for signal connection to the parking meters in order to directly update the parking information in any said parking meter after issuing a corresponding parking ticket.

5. The parking fee charging system of claim 1, wherein the management center includes an image processing unit for performing vehicle and license plate recognition based on images uploaded from the parking meters.

6. The parking fee charging system of claim 1, wherein the management center includes an automatic parking ticket issuing unit for issuing parking tickets automatically.

7. The parking fee charging system of claim 1, wherein the management center includes a guiding unit for recording locations and states of the on-street parking spaces according to the state of each said on-street parking space as transmitted from the corresponding parking meter.

8. The parking fee charging system of claim 7, wherein the mobile device is configured for connection to the management center through the application program and the network and for displaying on a map the location and the state of each said on-street parking space according to a record of the guiding unit.

9. The parking fee charging system of claim 1, wherein each said parking meter includes:
a housing;
a control circuit provided in the housing;
a display panel provided on a front side of the housing and electrically connected to the control circuit;
an operation panel provided on the front side of the housing and having a plurality of operation buttons, wherein each said operation button is electrically connected to the control circuit to enable operation of the parking meter through the operation buttons;
a chip card accessing device provided in the housing, electrically connected to the control circuit, and configured for accessing a chip card and thereby processing a fee payment made through the chip card;
at least one detector provided at a predetermined position of the housing, electrically connected to the control circuit, and configured for detecting a state of the corresponding on-street parking space;
at least one camera provided at a predetermined position of the housing, electrically connected to the control circuit, and configured for taking images of one or two said on-street parking spaces;
a communication module provided in the housing, electrically connected to the control circuit, and configured for communication with an external device; and
a battery module provided in the housing and configured for supplying electricity required by the parking meter.

10. The parking fee charging system of claim 9, wherein in each said parking meter, the at least one detector is provided on the front side of the housing, on a rear side of the housing, or at one or two predetermined positions of the housing.

11. The parking fee charging system of claim 9, wherein in each said parking meter, the at least one camera is provided on the front side of the housing or at one or two predetermined positions of the housing.

12. The parking fee charging system of claim 9, wherein in each said parking meter, the communication module comprises a security access module.

13. The parking fee charging system of claim 9, wherein each said parking meter further includes an artificial intelligence module for performing image and license plate recognition on a detected object.

14. The parking fee charging system of claim 1, further including a pair of auxiliary parking meters installed respectively at two opposite end edges of the at least one on-street parking space corresponding to each said parking meter, wherein each said auxiliary parking meter comprises at least one camera and a transmission module.

15. The parking fee charging system of claim 14, wherein each said pair of auxiliary parking meters and a corresponding said parking meter work together to take images of a vehicle in the at least one corresponding on-street parking space.

* * * * *